(12) United States Patent
Araki et al.

(10) Patent No.: US 11,920,015 B2
(45) Date of Patent: Mar. 5, 2024

(54) WEB, STAMPABLE SHEET, AND EXPANSION MOLDED PRODUCT

(71) Applicants: K-PLASHEET CORPORATION, Chiba (JP); TOYOTA BOSHOKU KABUSHIKI KAISHA, Kariya (JP)

(72) Inventors: Yutaka Araki, Chiba (JP); Seiji Hanatani, Chiba (JP); Tadaaki Yasumi, Chiba (JP); Tsutomu Takagi, Kakamigahara (JP); Atsuhiro Hattori, Aichi (JP)

(73) Assignees: K-PLASHEET CORPORATION, Chiba (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 834 days.

(21) Appl. No.: 16/971,682

(22) PCT Filed: Dec. 5, 2019

(86) PCT No.: PCT/JP2019/047711
§ 371 (c)(1),
(2) Date: Aug. 21, 2020

(87) PCT Pub. No.: WO2020/121945
PCT Pub. Date: Jun. 18, 2020

(65) Prior Publication Data
US 2020/0407527 A1    Dec. 31, 2020

(30) Foreign Application Priority Data
Dec. 13, 2018    (JP) .................. 2018-233906

(51) Int. Cl.
| | | |
|---|---|---|
| *C08J 9/00* | (2006.01) | |
| *C08J 5/24* | (2006.01) | |
| *C08J 9/232* | (2006.01) | |
| *D04H 1/413* | (2012.01) | |
| *D04H 3/002* | (2012.01) | |
| *D04H 3/004* | (2012.01) | |
| *D04H 3/011* | (2012.01) | |
| *D04H 3/015* | (2012.01) | |

(52) U.S. Cl.
CPC ............ *C08J 9/0085* (2013.01); *C08J 5/247* (2021.05); *C08J 5/249* (2021.05); *C08J 9/232* (2013.01); *D04H 1/413* (2013.01); *D04H 3/002* (2013.01); *D04H 3/004* (2013.01); *D04H 3/011* (2013.01); *D04H 3/015* (2013.01); *C08J 2323/12* (2013.01); *C08J 2467/00* (2013.01)

(58) Field of Classification Search
CPC . C08J 9/0085; C08J 5/247; C08J 5/249; C08J 9/232; C08J 2323/12; C08J 2467/00; C08J 5/18; C08J 5/04; D04H 1/413; D04H 3/002; D04H 3/004; D04H 3/011; D04H 3/015; D21H 21/54; D21H 13/10; D21H 13/36; D21H 13/50; D21H 21/56; B29C 70/06; B29C 44/20; B29C 70/28; B29C 70/66; B29L 2007/002; B29L 2031/3055
See application file for complete search history.

(56) References Cited

U.S. PATENT DOCUMENTS

| | | | |
|---|---|---|---|
| 5,854,149 A | 12/1998 | Nagayama et al. | |
| 7,092,544 B2 | 8/2006 | Hachiya et al. | |
| 8,123,990 B2 | 2/2012 | Watanabe | |
| 8,491,754 B2 † | 7/2013 | Araki | |
| 8,721,943 B2 † | 5/2014 | Moore | |
| 8,815,056 B2 * | 8/2014 | Araki | D21J 1/00 |
| | | | 428/323 |
| 8,834,759 B2 † | 9/2014 | Lalouch | |
| 10,619,017 B2 | 4/2020 | Mitsutsuji et al. | |
| 2017/0037549 A1 † | 2/2017 | Good et al. | |
| 2018/0162107 A1 † | 6/2018 | Xu | |

FOREIGN PATENT DOCUMENTS

| | | |
|---|---|---|
| CN | 101194070 A | 6/2008 |
| CN | 101498077 A | 8/2009 |
| CN | 102218866 A | 10/2011 |
| CN | 108137829 A | 6/2018 |

(Continued)

OTHER PUBLICATIONS

Mar. 10, 2020, International Search Report issued in the International Patent Application No. PCT/JP2019/047711.
Nov. 15, 2021, Office Action issued by the China National Intellectual Property Administration in the corresponding Chinese Patent Application No. 201980014842.3 with English language search report.
Sep. 14, 2021, Office Action issued by the Korean Intellectual Property Office in the corresponding Korean Patent Application No. 10-2020-7024294 with English language concise statement of relevance.

(Continued)

*Primary Examiner* — Irina S Zemel
(74) *Attorney, Agent, or Firm* — KENJA IP LAW PC

(57) ABSTRACT

To provide an expansion molded product not only excellent in sound absorption properties and rigidity but also resistant to tearing after bending deformation, and a web and a stampable sheet suitable for producing the expansion molded product. The presently disclosed web, stampable sheet, and expansion molded product contain a reinforcing fiber containing an inorganic fiber and an organic fiber, a thermoplastic resin, and a thermal expandable particle, where the proportion of the reinforcing fiber is 20 mass % or more and 55 mass % or less based on a total amount of the reinforcing fiber and the thermoplastic resin, the proportion of the organic fiber is 25 mass % or more and 77 mass % or less based on a total amount of the organic and inorganic fibers, the reinforcing fiber has an average length of 8 mm or more, and the organic fiber has a breaking elongation of 15% or more.

12 Claims, 4 Drawing Sheets

(56) References Cited

FOREIGN PATENT DOCUMENTS

| | | |
|---|---|---|
| EP | 1897990 A1 | 3/2008 |
| JP | S63283931 A | 11/1988 |
| JP | H0971663 A | 3/1997 |
| JP | H10316770 A | 12/1998 |
| JP | 2000328494 A | 11/2000 |
| JP | 2002369286 A | 12/2002 |
| JP | 2006342437 A | 12/2006 |
| JP | 2012107350 A | 6/2012 |
| JP | 2012206515 A | 10/2012 |
| JP | 2014069403 A | 4/2014 |
| JP | 2018165335 A | 10/2018 |

OTHER PUBLICATIONS

May 16, 2022, Office Action issued by the China National Intellectual Property Administration in the corresponding Chinese Patent Application No. 201980014842.3 with English language search report.

Sha Lizheng, Technology of Paper Converting, Feb. 28, 2009, pp. 177-179.

Yu Weidong, Textile Physics (2nd Edition), Sep. 30, 2009, pp. 120-121.

Xing Yuqing, Concise Plastic Encyclopedia, Sep. 30, 2002, pp. 314-315.

Zhang Yixin, Textile Materials, Dec. 31, 2005, pp. 285-286.

Mar. 23, 2021, Office Action issued by the Korean Intellectual Property Office in the corresponding Korean Patent Application No. 10-2020-7024294 with English language concise statement of relevance.

Mar. 1, 2021, the Extended European Search Report issued by the European Patent Office in the corresponding European Patent Application No. 19896596.4.

Sinclair (editor). Textiles and Fashion. No. 26, Copyright 2015. pp. 15, 23 and 97-114.†

Sinclair (editor), "Textiles and Fashion," No. 126 Copyright 2015, pp. 15, 23, 97-114, Woodhead Publishing.†

\* cited by examiner
† cited by third party

WEB, STAMPABLE SHEET, AND EXPANSION MOLDED PRODUCT

TECHNICAL FIELD

This disclosure relates to an expansion molded product of a stampable sheet used in, for example, automobile exterior materials and interior materials, and a web and a stampable sheet suitable for producing the expansion molded product.

BACKGROUND

An expansion molded product of a stampable sheet is a molded product obtained by heating a stampable sheet, which is a sheet-shaped press molding material containing reinforced fibers and a thermoplastic resin as main materials, to make it bulky and molding the stampable sheet. The expansion molded product has excellent sound absorption properties and rigidity and therefore is being used in automobile interior materials such as a ceiling or a trunk trim and automobile exterior materials such as an under cover.

JP 2000-328494 A (PTL 1) describes a stampable sheet containing 10 parts by mass to 450 parts by mass of reinforcing fibers and 2 parts by mass to 170 parts by mass of thermal expandable particles with respect to 100 parts by mass of a thermoplastic resin.

JP H10-316770 A (PTL 2) describes a stampable sheet containing reinforcing fibers composed of inorganic fibers and organic fibers, and a thermoplastic resin as main components, where the organic fibers are 5 parts by weight to 30 parts by weight with respect to 100 parts by weight of the reinforcing fibers in total.

JP 2018-165335 A (PTL 3) describes a reinforced fiber composite material containing a resin, first fibers, and second fibers having a larger specific gravity than the first fibers, which is a reinforced fiber composite material used in automobiles or the like.

CITATION LIST

Patent Literature

PTL 1: JP 2000-328494 A
PTL 2: JP H10-316770 A
PTL 3: JP 2018-165335 A

SUMMARY

Technical Problem

Automobile interior materials such as a ceiling material or a trunk side trim are required to have sound absorption properties to improve comfort in the vehicle. Since an expansion molded product of a stampable sheet is a porous material, it is being used in automobile interior materials by taking advantage of its light weight and sound absorption properties.

In the case of using the expansion molded product as a ceiling material, the expansion molded product is bent when a curtain airbag is activated, and the expansion molded product may be torn at that time. Therefore, it is required that the ceiling material should not be easily torn even if it is bent and deformed. The same is required for a trunk side trim installed in a vehicle because the expansion molded product may be cracked when it hits a luggage.

An under cover installed outside a vehicle is also required to have sound absorption properties as a measure against noise, particularly the sound absorption properties in the case where an air layer is provided in consideration of aerodynamic resistance. In addition, it is required to be resistant to tearing like the automobile interior material, so that the expansion molded product will not be bent or torn when subjected to an external force due to bouncing of pebbles or a splash of water.

However, it has been found that, when a bending load (bending deformation) is repeatedly applied to the expansion molded product prepared with the stampable sheets described in PTLS 1 to 3, the expansion molded product may be cracked and torn.

It could thus be helpful to provide an expansion molded product which is not only excellent in sound absorption properties and rigidity but also resistant to tearing after being subjected to bending deformation once or multiple times, and a web and a stampable sheet suitable for producing the expansion molded product.

Solution to Problem

We have conducted studies to solve the above problem and have found the following various problems (a) to (e).

(a) In PTL 1, when only inorganic fibers are used as reinforcing fibers, the specific gravity of the inorganic fibers is large. As a result, there are too many voids inside the expansion molded product when the thickness is large. Then, when the expansion molded product undergoes bending deformation, the inorganic fibers are easily deformed in the voids, so that the rigidity as an expansion molded product is lowered. In addition, the inorganic fibers of PTL 1 each have a small elongation. As a result, when the expansion molded product is deformed, the inorganic fibers are broken, and the expansion molded product is easily torn.

(b) When only organic fibers are used as reinforcing fibers, the dimensions change greatly as the temperature changes, and a part using the expansion molded product is deformed.

(c) Even in the case where inorganic fibers and organic fibers are used in combination as reinforcing fibers, the rigidity is lowered when the proportion of the reinforcing fibers is too large. Especially in Example 9 of PTL 1, although inorganic fibers and organic fibers are used in combination as reinforcing fibers, the adhesion between reinforcing fibers is insufficient and the expansion molded product is easily torn due to a large proportion of reinforcing fibers.

(d) In PTL 2, the compounding ratio of organic fibers with respect to the total amount of reinforcing fibers is low. As a result, when the expansion molded product is deformed, inorganic fibers, which occupy most of the reinforcing fibers, are broken, and the expansion molded product is cracked and easily torn.

(e) In PTL 3, inorganic fibers and organic fibers are used in combination, yet the average length of the reinforcing fibers used in Examples and Comparative Examples is short and the breaking elongation of the organic fibers is small. As a result, when the expansion molded product undergoes bending deformation, the reinforcing fibers are pulled out, and the expansion molded product is easily torn. Further, when pulp is contained, the cohesive force between fibers is increased. As a result, the extensibility is remarkably lowered, and tearing is likely to occur.

The present disclosure is based on the above discoveries. We thus provide the following.

(1) A web comprising a reinforcing fiber containing an inorganic fiber and an organic fiber, a thermoplastic resin, and a thermal expandable particle, wherein
  a proportion of the reinforcing fiber is 20 mass % or more and 55 mass % or less based on a total amount of the reinforcing fiber and the thermoplastic resin;
  a proportion of the organic fiber is 25 mass % or more and 77 mass % or less based on a total amount of the organic fiber and the inorganic fiber;
  the reinforcing fiber has an average length of 8 mm or more, and
  the organic fiber has a breaking elongation of 15% or more.

(2) The web according to (1), wherein the organic fiber has an average length of 8 mm or more.

(3) A stampable sheet comprising a reinforcing fiber containing an inorganic fiber and an organic fiber, and a thermal expandable particle in a matrix containing a thermoplastic resin, wherein
  a proportion of the reinforcing fiber is 20 mass % or more and 55 mass % or less based on a total amount of the reinforcing fiber and the thermoplastic resin;
  a proportion of the organic fiber is 25 mass % or more and 77 mass % or less based on a total amount of the organic fiber and the inorganic fiber;
  the reinforcing fiber has an average length of 8 mm or more, and
  the organic fiber has a breaking elongation of 15% or more.

(4) The stampable sheet according to (3), wherein the organic fiber has an average length of 8 mm or more.

(5) An expansion molded product in which a reinforcing fiber containing an inorganic fiber and an organic fiber, and an expanded thermal expandable particle are bonded via a thermoplastic resin, wherein
  a proportion of the reinforcing fiber is 20 mass % or more and 55 mass % or less based on a total amount of the reinforcing fiber and the thermoplastic resin;
  a proportion of the organic fiber is 25 mass % or more and 77 mass % or less based on a total amount of the organic fiber and the inorganic fiber;
  the reinforcing fiber has an average length of 8 mm or more, and
  the organic fiber has a breaking elongation of 15% or more.

(6) The expansion molded product according to (5), wherein the organic fiber has an average length of 8 mm or more.

Advantageous Effect

According to the present disclosure, it is possible to obtain an expansion molded product which is not only excellent in sound absorption properties and rigidity but also resistant to tearing after being subjected to bending deformation, and a web and a stampable sheet suitable for producing the expansion molded product.

BRIEF DESCRIPTION OF THE DRAWINGS

In the accompanying drawings.

DETAILED DESCRIPTION

Figure 1:
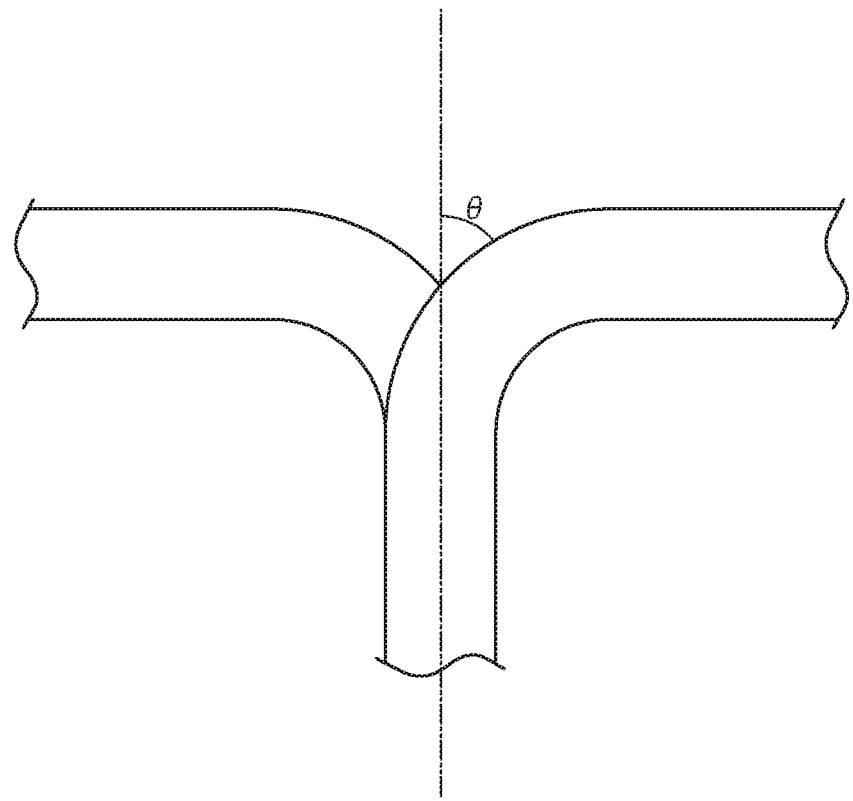
FIG. 1 illustrates a method of bending deformation under an environment of 23° C.

The present disclosure is a web in which a reinforcing fiber(s) containing an inorganic fiber(s) and an organic fiber(s), a thermoplastic resin(s), and a thermal expandable particle(s) are dispersed and contained. The web is preferably a foam-paper-made web produced by a foam-paper-making process.

In addition, the present disclosure is a stampable sheet in which a reinforcing fiber(s) containing an inorganic fiber(s) and an organic fiber(s), and a thermal expandable particle(s) are dispersed and contained in a matrix containing a thermoplastic resin(s). The stampable sheet is preferably a foam-paper-made stampable sheet obtained by heating, pressing, and cooling a foam-paper-made web.

Further, the present disclosure is an expansion molded product in which a reinforcing fiber(s) containing an inorganic fiber(s) and an organic fiber(s), and an expanded thermal expandable particle(s) are bonded via a thermoplastic resin. The expansion molded product is an expansion molded product of foam-paper-made stampable sheet obtained by heating, molding, and cooling a foam-paper-made stampable sheet.

In the web, stampable sheet, and expansion molded product of the present disclosure, it is important that the compounding ratios of the inorganic fiber, organic fiber, and thermoplastic resin be within the following ranges.

For the compounding ratio of the reinforcing fiber and the thermoplastic resin, the proportion of the reinforcing fiber is 20 mass % or more and 55 mass % or less based on the total amount of the reinforcing fiber and the thermoplastic resin. When the proportion of the reinforcing fiber is less than 20 mass %, the binding force between the reinforcing fiber and the thermal expandable particle by the thermoplastic resin is increased, and the expandability is hindered. As a result, the thickness of the expansion molded product is reduced, and the rigidity and the sound absorption properties are lowered. Note that when the compounding ratio of the thermal expandable particle is increased to increase the thickness of the expansion molded product, the air-flow resistance is increased, and the sound absorption properties are lowered. When the proportion of the reinforcing fiber is more than 55 mass %, the bonding between the reinforcing fiber and the thermal expandable particle by the thermoplastic resin is reduced, and the rigidity is lowered. In addition, the strength after bending deformation is reduced, and the expansion molded product is easily torn. The proportion of the reinforcing fiber is preferably 25 mass % or more and 52 mass % or less, and more preferably 30 mass % or more and 50 mass % or less.

The proportion of the organic fiber in the reinforcing fiber is 25 mass % or more and 77 mass % or less based on the total amount of the organic fiber and the inorganic fiber. When the proportion of the organic fiber is more than 77 mass %, the reinforcing effect by the inorganic fiber is reduced, the rigidity is lowered, and the dimensional change due to the thermal expansion and contraction of the organic fiber is increased. When the proportion of the organic fiber is less than 25 mass %, the inorganic fibers are increased, the strength after bending deformation is remarkably reduced, and the expansion molded product is easily torn.

When the expansion molded product is used in automobile interior materials such as a ceiling material or a trunk trim, it is required to have better rigidity and dimensional stability. To achieve both of these performances, the proportion of the organic fiber is preferably 25 mass % or more and 60 mass % or less based on the total amount of the organic fiber and the inorganic fiber.

On the other hand, when the expansion molded product is used in automobile exterior materials such as an under cover, it is required to have better impact absorption properties when, for example, a stone hits the under cover. To achieve these performances, the proportion of the organic fiber is preferably more than 40 mass % and 77 mass % or less based on the total amount of the organic fiber and the inorganic fiber. To further enhance the impact absorption, the proportion of the organic fiber is more preferably more than 50 mass % and 77 mass % or less.

The following describes the reinforcing fiber(s) containing the inorganic fiber(s) and the organic fiber(s), the thermoplastic resin(s), and the thermal expandable particle(s) forming the web, stampable sheet, and expansion molded product of the present disclosure in detail.

Examples of the inorganic fiber include glass fibers, carbon fibers, boron fibers, and mineral fibers. These may be used alone or in a combination of two or more. When it is desired to further enhance the strength, the inorganic fiber is preferably carbon fibers. From the viewpoint of cost, it is preferable to use glass fibers as the inorganic fiber.

Examples of the organic fiber include synthetic fibers such as aramid fibers, polyester fibers, polyamide fibers, and fluororesin fibers. These may be used alone or in a combination of two or more. These synthetic fibers are preferable to be natural organic fibers from the viewpoint of durability.

The average diameter of the reinforcing fibers is preferably 3 µmφ to 50 µmφ and more preferably 3 µmφ to 30 µmφ, from the viewpoint of sufficiently securing the reinforcing effect and the expandability of the stampable sheet. When it is expected to increase the expansion by a combined effect of the springback of the reinforcing fibers and the expandability of the thermal expandable particles, two kinds of reinforcing fibers having different average diameters may be mixed. This is because the expandability is efficiently exhibited when the reinforcing fibers having a large average diameter exhibit the expandability by the springback and the reinforcing fibers having a small average diameter fill up the gaps between the reinforcing fibers having a large average diameter to capture the thermal expandable particles.

The average length of the reinforcing fibers is 8 mm or more and preferably 8 mm or more and 100 mm or less, from the viewpoint of sufficiently securing the reinforcing effect, the expandability, and the moldability. The average length of the reinforcing fibers before the machining process of the web is more preferably 9 mm or more and 70 mm or less from the viewpoint of dispersing the thermoplastic resin and the reinforcing fibers more uniformly. The average length of the reinforcing fibers is more preferably 10 mm or more and 50 mm or less. Note that the "average diameter" and the "average length" of the reinforcing fibers are the average value of the diameters and the lengths of about 50 reinforcing fibers measured with, for example, an optical microscope and a ruler when the reinforcing fibers are still a raw material.

For the reinforcing fibers, the average length and breaking elongation of the organic fibers are particularly important. The average length of the organic fibers is preferably 8 mm or more. In this way, the expansion molded product can exhibit sufficient followability even when repeatedly subjected to bending deformation. The average length of the organic fibers is preferably 8 mm or more and 100 mm or less, more preferably 8 mm or more and 70 mm or less, and most preferably 10 mm or more and 50 mm or less. Although organic fibers having different average lengths may be mixed, it is preferable that the organic fibers having an average length of 8 mm or more account for 80 mass % or more of all organic fibers. In addition, in the case where fibers having a fiber length of 6 mm or less are mixed, they are easily broken when repeatedly subjected to bending deformation. Therefore, it is preferable that the organic fiber does not contain fibers having a fiber length of 6 mm or less.

Further, the breaking elongation of the organic fibers is 15% or more. When the breaking elongation of the organic fibers is 15% or more, the organic fibers, even if repeatedly subjected to bending deformation, can follow the deformation because of the large elongation of the organic fibers. This can suppress the breakage of the expansion molded product. The breaking elongation is preferably 15% or more and 150% or less, and more preferably 20% or more and 100% or less. In the case where the organic fibers have a breaking elongation of less than 15%, they are easily broken when repeatedly subjected to bending deformation.

In the case where the average length of the inorganic fibers is also 8 mm or more, the expansion molded product can exhibit sufficient followability even when repeatedly subjected to bending deformation. The average length of the inorganic fibers is preferably 8 mm or more and 100 mm or less, more preferably 9 mm or more and 70 mm or less, and most preferably 10 mm or more and 50 mm or less.

The reinforcing fibers are preferably fibrillated into mono filaments. When the reinforcing fibers are in a bundle, it is difficult for the thermoplastic resin to infiltrate into the bundle and bond the fibers. As a result, the reinforcing fibers inside the bundle are easily pulled out and broken when repeated subjected to bending deformation.

The inorganic fibers in the reinforcing fibers are preferably surface-treated with a coupling agent or a sizing agent. In order to improve the wettability and the adhesiveness between the inorganic fibers and the thermoplastic resin, it is particularly preferable to perform the surface treatment with a silane coupling agent. Examples of the silane coupling agent include vinylsilane-based, aminosilane-based, epoxysilane-based, methacrylsilane-based, chlorosilane-based, and mercaptosilane-based coupling agents. The surface treatment with the silane coupling agent can be performed with a known method such as a method of spraying a solution containing the silane coupling agent while stirring the inorganic fibers, or a method of immersing the inorganic fibers in a solution containing the silane coupling agent.

The amount of the silane coupling agent treated is preferably 0.001 mass % or more and 0.3 mass % or less base on the mass of the inorganic fibers to be treated. This is because, when the amount of the silane coupling agent treated is 0.001 mass % or more, the effect of the silane coupling agent is sufficiently obtained, and adhesiveness between the inorganic fibers and the thermoplastic resin is improved; when the amount of the silane coupling agent treated is 0.3 mass % or less, the effect of the silane coupling agent will not be saturated. The amount of the silane coupling agent treated is more preferably 0.005 mass % or more and 0.2 mass % or less.

In order to improve the strength and the expandability of the stampable sheet, the reinforcing fibers (inorganic fibers and organic fibers) are preferably easily fibrillated into mono filaments by using, for example, a water-soluble sizing agent. The sizing agent may be a polyethylene oxide-based or polyvinyl alcohol-based water-soluble resin or the like.

The amount of the sizing agent treated is preferably 2 mass % or less based on the mass of the reinforcing fibers to be treated. This is because, when the amount of the sizing agent treated is 2 mass % or less, the reinforcing fibers can be easily fibrillated in the machining process. The amount of the sizing agent treated is more preferably 1 mass % or less. From the viewpoint of handleability, the lower limit of the amount of the sizing agent treated is preferably 0.05 mass %.

Examples of the thermoplastic resin include a polyolefin-based resin such as polyethylene and polypropylene; polystyrene, polyvinyl chloride, polyethylene terephthalate, polycarbonate, polyamide, polyacetal and the like; and a thermoplastic elastomer such as ethylene-vinyl chloride copolymer, ethylene-vinyl acetate copolymer, styrene-butadiene-acrylonitrile copolymer, EPM, and EPDM. These may be used alone or in a combination of two or more.

From the viewpoint of obtaining excellent strength, rigidity and moldability, it is preferable to select a polyolefin-based resin such as polyethylene or polypropylene among these thermoplastic resins. Polypropylene is particularly preferable because it has an excellent balance of strength, rigidity and moldability and has a low price. The polypropylene is preferably one having a MFR (melt flow rate at 230° C. and 21.17 N) of 1 g/10 min to 200 g/10 min measured under the conditions defined in JIS K 6921-2: 1997, and more preferably one having a MFR of 10 g/10 min to 170 g/10 min.

From the viewpoint of improving the adhesiveness between the thermoplastic resin and the reinforcing fibers, a thermoplastic resin that has been modified with various compounds, such as an acid like unsaturated carboxylic acid or unsaturated carboxylic acid anhydride and an epoxy compound, can be used in combination with a thermoplastic resin that has not been modified. The modification treatment can be performed, for example, by graft-copolymerizing the polypropylene with maleic acid, maleic anhydride, acrylic acid or the like. From the viewpoint of improving the strength, it is preferable to use a thermoplastic resin having a modified group such as an acid anhydride group or a carboxyl group in the molecule.

The form of the thermoplastic resin may be powder, particles such as pellets or flakes, or fibers. It is preferable to use a fibrous thermoplastic resin and a particulate thermoplastic resin in combination from the viewpoint of improving the handleability of the web and the yield of the thermal expandable particles and from the viewpoint of further improving the strength and the rigidity by fully entangling the molten thermoplastic resin with the reinforcing fibers when producing the stampable sheet. The particulate thermoplastic resin preferably has an average particle size of 50 µmφ to 2000 µmφ, where the average particle size is more preferably 50 µmφ to 1000 µmφ from the viewpoint of uniformly dispersing the thermoplastic resin in the stampable sheet. The fibrous thermoplastic resin preferably has an average diameter of 1 µmφ to 50 µmφ and an average length of 1 mm to 70 mm, where the average length is more preferably 1 mm to 30 mm from the viewpoint of uniformly dispersing the thermoplastic resin in a foamy solution.

The thermal expandable particle may be known ones. However, it is preferable to use core-shell thermal expandable particle(s) in which the core is a liquid organic substance and the core is enclosed by a shell made of a thermoplastic resin having gas-barrier properties. When the core-shell thermal expandable particles are heated to a certain temperature or higher, the softened shell expands because of the pressure caused by the vaporization and expansion of the core. The liquid organic substance used for the core is preferably an organic substance having a boiling point that is lower than the softening point of the thermoplastic resin used for the shell. Examples of the organic substance include hydrocarbons and ethers having a boiling point of 150° C. or lower, such as isobutane, pentane, and hexane. Examples of the thermoplastic resin used for the shell include a polyolefin-based resin such as polyethylene, polypropylene, and ethylene-propylene copolymer; polystyrene, polyvinyl chloride, polyvinylidene chloride, methacrylate resin, ABS resin, ethylene-vinyl acetate copolymer, polyamide resin, polyethylene terephthalate, polybutylene terephthalate, polyurethane, polyacetal, polyphenylene sulfide, fluororesin, and other thermoplastic resins. It is more preferable to use thermal expandable particles in which the core is made of liquid hydrocarbon such as isobutane, pentane and hexane, and the shell is made of a thermoplastic resin such as acrylonitrile copolymer and polyvinylidene chloride.

The average diameter of the thermal expandable particles is preferably 5 µmφ or more and 200 µmφ or less, more preferably 10 µmφ or more and less than 100 µmφ, and further preferably 20 µmφ or more and less than 100 µmφ before the expansion under heating (that is, when they are still a raw material). This is because, when the average diameter of the thermal expandable particles is 5 µmφ or more, the thermal expandable particles hardly pass through the gaps between the reinforcing fibers to fall off during the machining process, so that the yield will not be lowered; when the average diameter of the thermal expandable particles is 200 µmφ or less, the thickness of the expansion molded product is uniform, so that the surface quality will not be deteriorated.

The average diameter of the thermal expandable particles after the expansion under heating is preferably 10 µmφ or more and 2000 µmφ or less, and more preferably 20 µmφ or more and 1000 µmφ or less. This is because, when the average diameter after the expansion under heating is 10 µmφ or more, the amount (number) of thermal expandable particles required to expand the stampable sheet can be reduced; when the average diameter after the expansion under heating is 2000 µmφ or less, no irregularity will occur on the surface of the expansion molded product, and the surface properties will not be deteriorated. Note that the thermal expandable particles after the expansion under heating are hollow.

The average diameter before the expansion under heating is an average value of diameters obtained by observing and measuring about 50 thermal expandable particles with an optical microscope when they are still a raw material. In addition, the average diameter after the expansion under heating is an average value of diameters obtained by observing and measuring about 50 thermal expandable particles in the expansion molded product with an optical microscope.

The expansion starting temperature of the thermal expandable particles is preferably 120° C. or higher, and more preferably 130° C. or higher and 230° C. or lower. When the expansion starting temperature of the thermal expandable particles is 120° C. or higher, the heat resistance of the thermal expandable particles can be sufficiently ensured. As a result, there is no need to extremely lower the drying temperature of the machined web and the drying can be completely in a short time. When the expansion starting temperature of the thermal expandable particles is 230° C. or lower, the thermoplastic resin will not be deteriorated due to the heating for the expansion. The expansion starting temperature of the thermal expandable particles is defined by a temperature at which the average particle size is 1.2 times after allowing the thermal expandable particles to stand for one minute in a hot air heating furnace set to a predetermined temperature.

The difference between the expansion starting temperature of the thermal expandable particles and the melting point of the thermoplastic resin is preferably within ±30° C. This is because, when the expansion starting temperature is much lower than the melting point of the thermoplastic resin, the thermal expandable particles are excessively expanded before the thermoplastic resin melts and attaches around the reinforcing fibers; on the other hand, when the expansion starting temperature is too high, it is required to heat the stampable sheet to a high temperature to obtain a sufficient expanded thickness, which may deteriorate the thermoplastic resin.

The maximum expansion temperature of the thermal expandable particles is preferably higher than the melting point of the thermoplastic resin, and the temperature difference is more preferably within 50° C. from the viewpoint of preventing deterioration of the thermoplastic resin. As used herein, the "maximum expansion temperature" means a temperature at which the particle size of the thermal expandable particles is maximum when the temperature of the thermal expandable particles is raised at a rate of 10° C./min.

The weight per unit area of the thermal expandable particles is preferably 5 g/m$^2$ or more and 100 g/m$^2$ or less. This is because, when the weight per unit area of the thermal expandable particles is 5 g/m$^2$ or more, the expandability can be further improved; when the weight per unit area of the thermal expandable particles is 100 g/m$^2$ or less, the thermal expandable particles will not excessively expand, so that the rigidity will not be lowered due to a low density of not only the inside but also the surface layer of the expansion molded product.

The weight per unit area of the web can be appropriately set to a value suitable for a final product such as an automobile interior material. For example, in the case of an automobile interior material, the weight per unit area of the web is preferably 100 g/m$^2$ to 1200 g/m$^2$; and in the case of an automobile exterior material, the weight per unit area of the web is preferably 400 g/m$^2$ to 2000 g/m$^2$. A film or a non-woven fabric can be attached to the surface of the stampable sheet or the expansion molded product depending on the function required for the final product.

The web, stampable sheet, and expansion molded product of the present disclosure may appropriately contain additives such as antioxidant, light-resisting stabilizer, metal inactivating agent, flame retardant, carbon black, VOC absorber, VOC decomposer and deodorant; a coloring agent; or a binder such as an organic binder, in addition to the above-described reinforcing fibers, thermoplastic resin, and thermal expandable particles. The additives, coloring agent, and binder may be appropriately contained in the web, stampable sheet, and expansion molded product by, for example, being coated onto the reinforcing fibers or the thermoplastic resin in advance, or being compounded during the mixing of the reinforcing fibers and the thermoplastic resin, or being sprayed through a sprayer or the like.

The method of producing the web, stampable sheet, and expansion molded product of the present disclosure is not particularly limited. For example, they can be produced by the known foam-paper-making process described in JP 2006-342437 A. For example, reinforcing fibers and a thermoplastic resin having the above-described compounding ratio are dispersed into a medium such as a foamy solution obtained by adding a surfactant to water, to obtain a dispersing solution. The dispersing solution is poured onto a paper-making screen to remove the foam, to obtain a non-woven web. Subsequently, the web is heated, pressed, and cooled to obtain a stampable sheet in which reinforcing fibers containing inorganic fibers and organic fibers, and thermal expandable particles are dispersed and contained in a matrix made of a thermoplastic resin. Subsequently, the stampable sheet is heated and expanded and then press-formed to obtain an expansion molded product in which the reinforcing fibers containing inorganic fibers and organic fibers, and the expanded thermal expandable particles are bonded by the thermoplastic resin and dispersed.

EXAMPLES

Experiment 1

A dispersing solution was obtained by adding 0.5 g of sodium dodecylbenzene sulfonate as a surfactant to 1.5 liters of water, which was stirred to prepare a foamy solution containing fine bubbles, charging the reinforcing fibers listed in Table 1-1 and the thermoplastic resin listed in Table 1-2 into the foamy solution at a compounding ratio by dry mass listed in Table 2, and further charging the thermal expandable particles listed in Table 1-3 so that the weight per unit area was the value listed in Table 2, and stirring the solution for 10 minutes to disperse the thermal expandable particles. Subsequently, the dispersing solution was poured into a paper machine, vacuumed, and defoamed to obtain a web. Note that a porous support having an opening hole of 0.1 mm×0.2 mm was used in the machining process.

Next, the obtained web was dried at a temperature of 120° C. for 90 minutes. Subsequently, the non-woven fabric listed in Table 1-4 was laminated on the web so that the laminated structure was as listed in Table 2, to obtain a laminate. Subsequently, the laminate was placed between press boards of 180° C. and pressed under a pressure of 0.1 MPa for 30 seconds so that the thermal expandable particles would not expand to the maximum extent. Subsequently, the heated and pressed web was placed between cooling boards, the cooling boards were closed to provide a clearance of 2 mm, and the web was cooled to obtain a stampable sheet (foam-paper-made stampable sheet).

Next, the obtained stampable sheet was heated to 190° C. in a far-infrared oven to melt the thermoplastic resin and expand the thermal expandable particles, and then the stampable sheet was placed on a mold set to a predetermined clearance and compressed and cooled to obtain an expansion molded product having the thickness listed in Table 2.

Next, a test piece having a length of 150 mm and a width of 50 mm was sampled from the obtained expansion molded product, and the test piece was repeatedly subjected to bending deformation in an environment of 23° C., and then the tensile strength was measured.

As illustrated in FIG. 1, the test piece was bent so that θ (clockwise is positive)=180°, and then the test piece was bent to the opposite side so that θ=−180°. This operation was repeated 5 times.

Next, the test piece was subjected to a tensile testing machine, and the maximum strength and elongation ratio were measured under the conditions of a chuck distance of 90 mm and a crosshead speed of 100 mm/min. The measurement results are listed in Table 2. In the case where the breaking strength exceeds 20 N/cm and the elongation ratio exceeds 10%, it can be evaluated as resistant to tearing after bending deformation.

As indicated in Table 2, it was found that Examples 1-1 to 1-4 had a higher breaking strength and a higher elongation ratio after repeated bending deformation in the environment of 23° C. than Comparative Examples 1-1 to 1-8.

TABLE 1-1

| Component | Specific gravity | Average diameter (μm) | Average length (mm) | Elastic modulus (GPa) | Breaking elongation (%) |
|---|---|---|---|---|---|
| Carbon fiber (PAN type) A | 1.8 | 7 | 13 | 240 | 2 |
| Glass fiber | 2.5 | 13 | 13 | 73 | 2 |
| Carbon fiber (PAN type) B | 1.8 | 7 | 6 | 240 | 2 |
| Polyester fiber (core-sheath) | 1.4 | 18 | 10 | 13 | 29 |
| Polyester fiber A | 1.4 | 12 | 10 | 13 | 30 |
| Polyester fiber (crimped) | 1.4 | 18 | 10 | 13 | 30 |
| Polyester fiber B | 1.4 | 11 | 5 | 13 | 30 |
| Vinylon | 1.3 | 14 | 5 | 30 | 20 |
| Aramid fiber | 1.4 | 12 | 6 | 74 | 5 |
| Bamboo rayon | 1.4 | 30 | 10 | 10 | 5 |

TABLE 1-2

| | Component | Form | Average particle size (μm) | Melting point (° C.) | MI (g/10 min) |
|---|---|---|---|---|---|
| Thermoplastic resin | Polypropylene particle | Particle | 500 | 165 | 100 |

TABLE 1-3

| Component | | | Average particle size (μm) | Foaming starting temperature (° C.) | Maximum foaming temperature (° C.) |
|---|---|---|---|---|---|
| | Core part | Shell part | | | |
| Thermal expandable particle | Hydrocarbon | Acrylonitrile copolymer | 70 | 155 | 175 |

TABLE 1-4

| | Abbreviation | Type |
|---|---|---|
| Single-layer film | PP30 | Polypropylene thickness 30 μm |
| Multi-layer film | PP30/PA20 | Two-layer film of polypropylene thickness 30 μm/nylon thickness 20 μm |
| | LLDPE50/PP40 | Two-layer film of linear low-density polyethylene thickness 50 μm/polypropylene thickness 40 μm |
| | PE15/PA10/PE20 | Three-layer film of low-density polyethylene thickness 15 μm/nylon thickness 10 μm/low-density polyethylene thickness 20 μm |
| Non-woven fabric | SB15 | Polyester spunbond 15 g/m² |
| | SB70 | Polyester spunbond 70 g/m² |
| | NW150 | Polyester non-woven fabric 150 g/m² |

TABLE 2

| Classification | Web Constituent material | | | | | | | | | Weight per unit area (g/m²) | Stampable sheet Laminated structure | Thickness (mm) | Expansion molded product Characteristic | | |
|---|---|---|---|---|---|---|---|---|---|---|---|---|---|---|---|
| | Inorganic fiber | | Organic fiber | | | Thermoplastic resin | | Thermal expandable particle Weight per unit area (g/m²) | Proportion of reinforcing fiber (mass %) | Proportion of organic fiber (mass %) | | | | Presence of cracks after repeated bending deformation | Breaking strength after repeated bending deformation (N/cm) | Breaking elongation after repeated bending deformation (%) |
| | Component | Mass % | Component | Mass % | Component | mass % | | | | | | | | | |
| Comparative Example 1-1 | Glass fiber | 45 | — | — | Polypropylene particle | 55 | 10 | 45 | 0 | 1100 | SB15/web/SB15 | 8 | Yes | 9 | 4.9 |
| Comparative Example 1-2 | Carbon fiber A | 36 | Polyester fiber (core-sheath) | 9 | Polypropylene particle | 55 | 10 | 45 | 20 | 1100 | SB15/web/SB15 | 8 | Yes | 12 | 7.3 |
| Comparative Example 1-3 | Glass fiber | 30 | Polyester fiber A | 35 | Polypropylene particle | 35 | 10 | 65 | 54 | 1100 | SB15/web/SB15 | 8 | Yes | 8 | 5.5 |
| Example 1-1 | Glass fiber | 13 | Polyester fiber (core-sheath) | 32 | Polypropylene particle | 55 | 10 | 45 | 71 | 1100 | SB15/web/SB15 | 8 | No | 37 | 20.9 |
| Example 1-2 | Glass fiber | 22 | Polyester fiber A | 23 | Polypropylene particle | 55 | 10 | 45 | 51 | 1100 | SB15/web/SB15 | 7 | No | 25 | 17.9 |
| Example 1-3 | Glass fiber | 13 | Polyester fiber A | 32 | Polypropylene particle | 55 | 10 | 45 | 71 | 1100 | SB15/web/SB15 | 8 | No | 25 | 21.6 |
| Example 1-4 | Glass fiber | 19 | Polyester fiber A | 21 | Polypropylene particle | 60 | 10 | 40 | 53 | 1100 | SB15/web/SB15 | 8 | No | 21 | 18.4 |
| Comparative Example 1-4 | Glass fiber | 22 | Polyester fiber B | 23 | Polypropylene particle | 55 | 20 | 45 | 51 | 1100 | SB15/web/SB15 | 8 | No | 20 | 7.1 |
| Comparative Example 1-5 | Glass fiber | 22 | Vinylon | 23 | Polypropylene particle | 55 | 20 | 45 | 51 | 1100 | SB15/web/SB15 | 8 | No | 23 | 8.5 |
| Comparative Example 1-6 | Glass fiber | 22 | Aramid fiber | 23 | Polypropylene particle | 55 | 20 | 45 | 51 | 1100 | SB15/web/SB15 | 8 | No | 15 | 6.7 |
| Comparative Example 1-7 | Glass fiber | 22 | Bamboo rayon | 23 | Polypropylene particle | 55 | 20 | 45 | 51 | 1100 | SB15/web/SB15 | 8 | No | 24 | 7.4 |
| Comparative Example 1-8 | Carbon fiber B | 19 | Polyester fiber A | 21 | Polypropylene particle | 60 | 20 | 40 | 53 | 1100 | SB15/web/SB15 | 8 | No | 17 | 6.5 |

Experiment 2

A web in which the compounding ratio of the reinforcing fibers and the thermoplastic resin was the value listed in Table 3 was obtained with the same method as in Experiment 1. A film or a non-woven fabric was laminated on both sides of the web and then the web was heated, pressed, and cooled with the same method as in Experiment 1 to obtain a stampable sheet. The stampable sheet was heated, compressed, and cooled with the same method as in Experiment 1 to obtain an expansion molded product. The thickness of the expansion molded product was adjusted by changing the thickness of the spacer during cooling.

For Examples 2-1 and 2-2 and Comparative Examples 2-1 and 2-2, a test piece having a length of 150 mm and a width of 50 mm was sampled from the expansion molded product and subjected to a three-point bend test at a span of 100 mm and a crosshead speed of 50 mm/min under a load, to measure an elastic slope determined from an initial gradient of a load-displacement curve. The load was applied to the PP30 side in Example 2-1 and Comparative Example 2-1; the load was applied to the SB15 surface in Example 2-2; and the load was applied to the LLDPE50 side in Comparative Example 2-2.

Figure 2A:
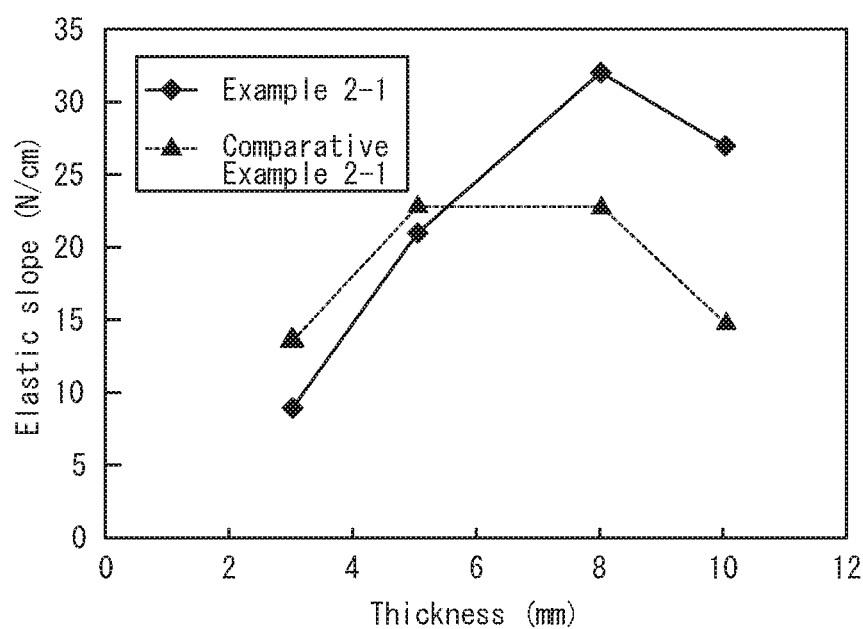
FIG. 2A is a graph illustrating a comparison of elastic slope of the expansion molded products of Example 2-1 and Comparative Example 2-1.
Figure 2B:
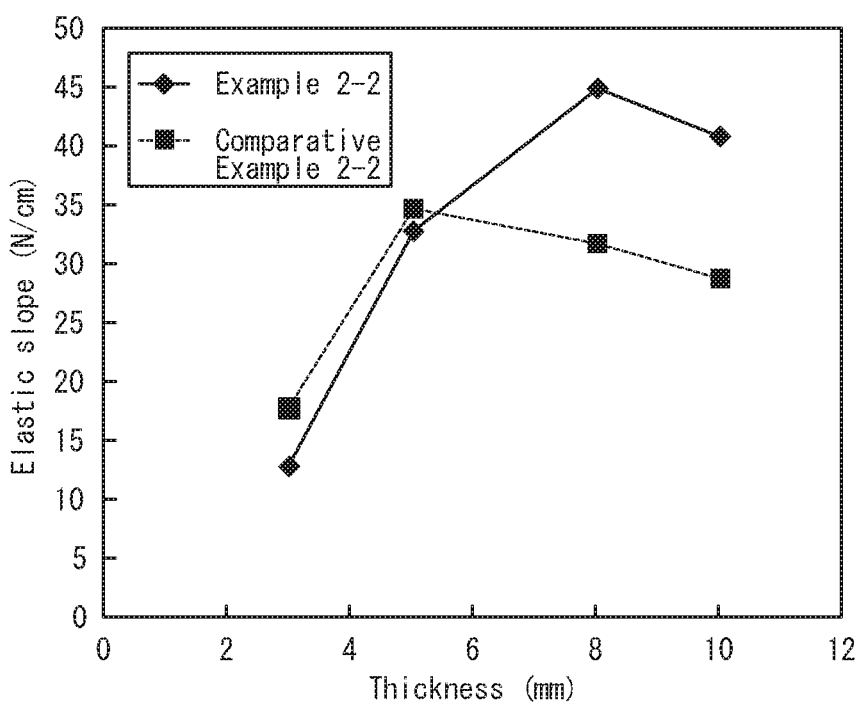
FIG. 2B is a graph illustrating a comparison of elastic slope of the expansion molded products of Example 2-2 and Comparative Example 2-2.

The measurement results are illustrated in FIGS. 2A and 2B. It was found that Examples 2-1 and 2-2 were superior in rigidity to Comparative Examples 2-1 and 2-2 because the thickness at which the elastic slope was maximized was larger than that of Comparative Examples 2-1 and 2-2.

Figure 3:
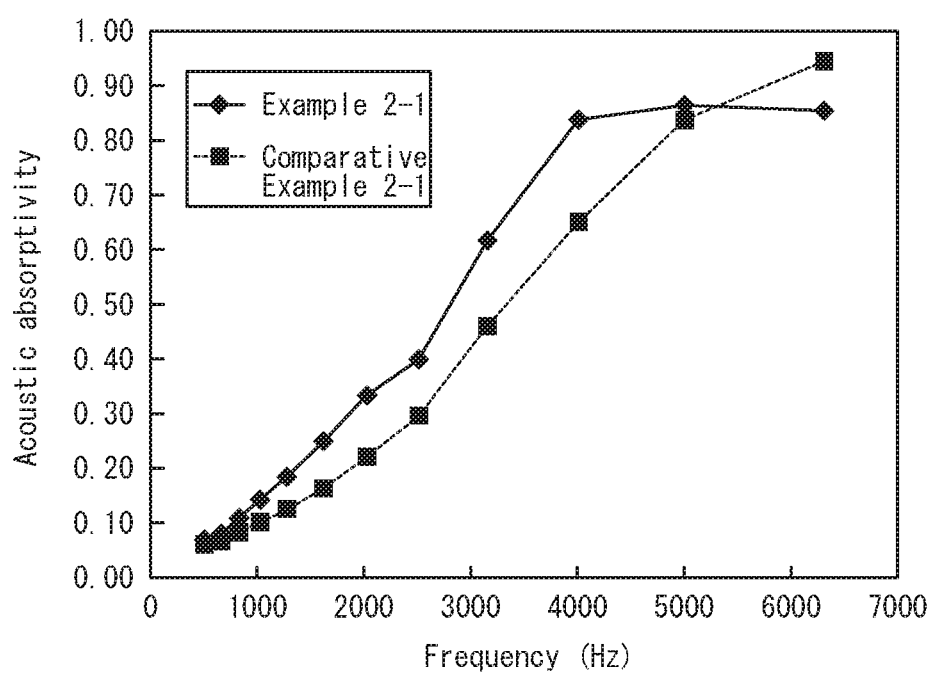
FIG. 3 is a graph illustrating a comparison of sound absorption properties of the expansion molded products of Example 2-1 and Comparative Example 2-1.

For Example 2-1 (thickness 8 mm) and Comparative Example 2-1 (thickness 8 mm), the acoustic absorptivity of vertically incident sound at a state of a back air layer of 0 mm was measured by vertically injecting a sound wave to a surface of the PP30 side according to JIS A 1405:1998. The measurement results are illustrated in FIG. 3. It was found that Example 2-1 was superior not only in rigidity and but also in sound absorption properties (back air layer 0 mm) to Comparative Example 2-1.

For Example 2-4 (thickness 6 mm) and Comparative Example 2-3 (thickness 6 mm), the acoustic absorptivity of vertically incident sound at a state of a back air layer of 60 mm was measured by vertically injecting a sound wave to a

TABLE 3

| | Web Constituent material | | | | | | |
|---|---|---|---|---|---|---|---|
| | Inorganic reinforcing fiber | | Organic reinforcing fiber | | Thermoplastic resin | | Thermal expandable particle Weight per unit area ($g/m^2$) | Proportion of reinforcing fiber (mass %) |
| Classification | Component | Mass % | Component | Mass % | (mass %) | Mass % | | |
| Example 2-1 | Glass fiber | 25 | Polyester fiber A | 20 | Polypropylene particle | 55 | 30 | 45 |
| Example 2-2 | Carbon fiber A | 10 | Polyester fiber (crimped) | 10 | Polypropylene particle | 80 | 30 | 20 |
| Comparative Example 2-1 | Glass fiber | 45 | — | 0 | Polypropylene particle | 55 | 30 | 45 |
| Comparative Example 2-2 | Carbon fiber A | 20 | — | 0 | Polypropylene particle | 80 | 30 | 20 |
| Example 2-3 | Glass fiber | 15 | Polyester fiber (core-sheath) | 30 | Polypropylene particle | 55 | 10 | 45 |
| Example 2-4 | Glass fiber | 20 | Polyester fiber A | 20 | Polypropylene particle | 60 | 10 | 40 |
| Example 2-5 | Glass fiber | 30 | Polyester fiber (core-sheath) | 10 | Polypropylene particle | 60 | 10 | 40 |
| Comparative Example 2-3 | Glass fiber | 45 | — | 0 | Polypropylene particle | 55 | 10 | 45 |

Figure 4:
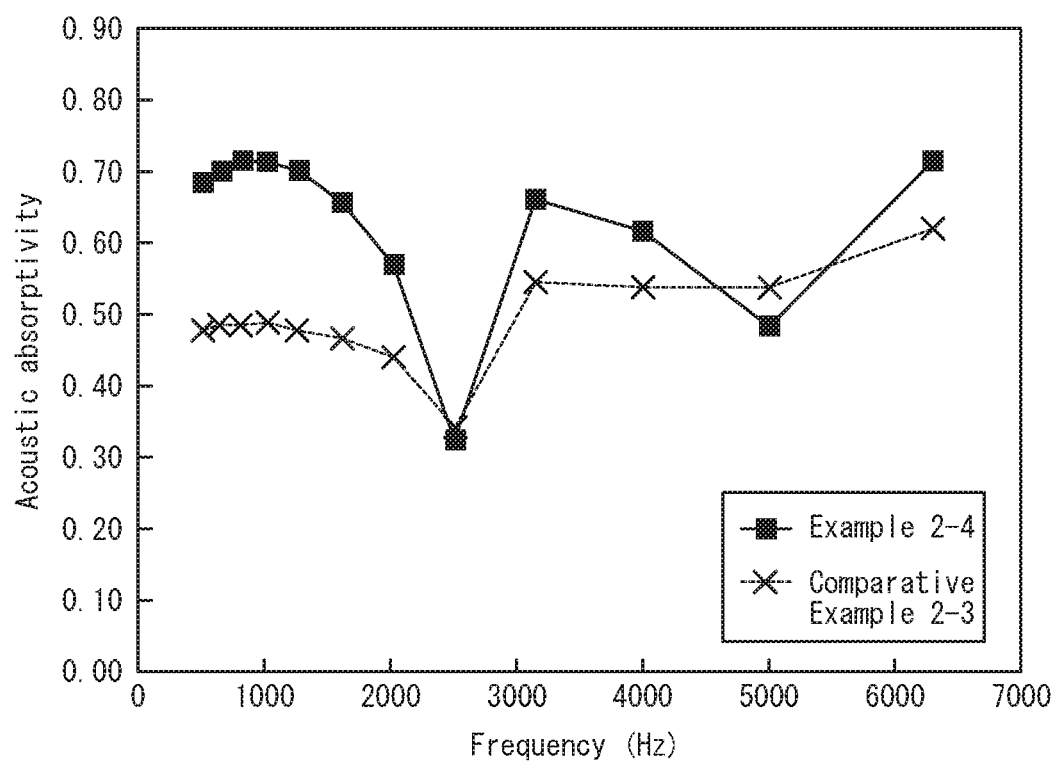
FIG. 4 is a graph illustrating a comparison of sound absorption properties of the expansion molded products of Example 2-4 and Comparative Example 2-3.

| | Web | | | Expansion molded product Repeated bending test | |
|---|---|---|---|---|---|
| | | | | | Appearance |
| Classification | Proportion of organic fiber (mass %) | Weight per unit area ($g/m^2$) | Stampable sheet Laminated structure | Test piece thickness (mm) | after test Presence of cracks |
| Example 2-1 | 44 | 300 | PP30/web/PP30/PA20 | 8 | No |
| Example 2-2 | 50 | 250 | SB15/PP30/web/PE15/PA10/PE20 | 8 | No |
| Comparative Example 2-1 | 0 | 300 | PP30/web/PP30/PA20 | 8 | Yes |
| Comparative Example 2-2 | 0 | 300 | LLDPE50/PP40/web/PE15/PA10/PE20 | 8 | No |
| Example 2-3 | 67 | 1000 | web | 8 | No |
| Example 2-4 | 50 | 1000 | SB15/web/SB15 | 8 | No |
| Example 2-5 | 25 | 1000 | SB15/web/NW150 | 8 | No |
| Comparative Example 2-3 | 0 | 1000 | Polyester spunbond 15 $g/m^2$/web/NW150 | 8 | Yes | surface of the SB15 side according to JIS A 1405:1998. The measurement results are illustrated in FIG. 4. It was found that Example 2-4 was superior in sound absorption properties (back air layer 60 mm) to Comparative Example 2-3.

For Examples 2-1 to 2-5 and Comparative Examples 2-1 to 2-3, a test piece having a length of 150 mm and a width of 50 mm was sampled from the obtained expansion molded product. The test piece was repeatedly subjected to bending deformation with the same method as in [Experiment 1] (23° C., repeated 5 times), and the state of the test piece after the test was visually observed. The observation results are listed in Table 3. No cracks were observed in any Example, and all Examples had a good result.

INDUSTRIAL APPLICABILITY

According to the present disclosure, it is possible to obtain an expansion molded product which is not only excellent in sound absorption properties and rigidity but also resistant to tearing after bending deformation, and a web and a stampable sheet suitable for producing the expansion molded product.

The invention claimed is:

1. A web comprising a reinforcing fiber containing an inorganic fiber and an organic fiber, a thermoplastic resin, and a thermal expandable particle, wherein
　　a proportion of the reinforcing fiber is 20 mass % or more and 55 mass % or less based on a total amount of the reinforcing fiber and the thermoplastic resin;
　　a proportion of the organic fiber is 25 mass % or more and 77 mass % or less based on a total amount of the organic fiber and the inorganic fiber;
　　the reinforcing fiber has an average length of 8 mm or more;
　　the organic fiber has a breaking elongation of 15% or more;
　　the inorganic fiber is one or more selected from the group consisting of glass fibers and carbon fibers;
　　the organic fiber is one or more selected from the group consisting of polyester fibers and fluororesin fibers; and
　　the thermoplastic resin is one or more selected from polyolefin-based resins.

2. The web according to claim 1, wherein the organic fiber has an average length of 8 mm or more.

3. A stampable sheet comprising a reinforcing fiber containing an inorganic fiber and an organic fiber, and a thermal expandable particle in a matrix containing a thermoplastic resin, wherein
　　a proportion of the reinforcing fiber is 20 mass % or more and 55 mass % or less based on a total amount of the reinforcing fiber and the thermoplastic resin;
　　a proportion of the organic fiber is 25 mass % or more and 77 mass % or less based on a total amount of the organic fiber and the inorganic fiber;
　　the reinforcing fiber has an average length of 8 mm or more;
　　the organic fiber has a breaking elongation of 15% or more;
　　the inorganic fiber is one or more selected from the group consisting of glass fibers and carbon fibers;
　　the organic fiber is one or more selected from the group consisting of polyester fibers and fluororesin fibers; and
　　the thermoplastic resin is one or more selected from polyolefin-based resins.

4. The stampable sheet according to claim 3, wherein the organic fiber has an average length of 8 mm or more.

5. An expansion molded product in which a reinforcing fiber containing an inorganic fiber and an organic fiber, and an expanded thermal expandable particle are bonded via a thermoplastic resin, wherein
　　a proportion of the reinforcing fiber is 20 mass % or more and 55 mass % or less based on a total amount of the reinforcing fiber and the thermoplastic resin;
　　a proportion of the organic fiber is 25 mass % or more and 77 mass % or less based on a total amount of the organic fiber and the inorganic fiber;
　　the reinforcing fiber has an average length of 8 mm or more;
　　the organic fiber has a breaking elongation of 15% or more;
　　the inorganic fiber is one or more selected from the group consisting of glass fibers and carbon fibers;
　　the organic fiber is one or more selected from the group consisting of polyester fibers and fluororesin fibers; and
　　the thermoplastic resin is one or more selected from polyolefin-based resins.

6. The expansion molded product according to claim 5, wherein the organic fiber has an average length of 8 mm or more.

7. The web according to claim 1, wherein the organic fiber is one or more selected from polyester fibers.

8. The web according to claim 2, wherein the organic fiber is one or more selected from polyester fibers.

9. The stampable sheet according to claim 3, wherein the organic fiber is one or more selected from polyester fibers.

10. The stampable sheet according to claim 4, wherein the organic fiber is one or more selected from polyester fibers.

11. The expansion molded product according to claim 5, wherein the organic fiber is one or more selected from polyester fibers.

12. The expansion molded product according to claim 6, wherein the organic fiber is one or more selected from polyester fibers.

\* \* \* \* \*